United States Patent [19]

Nishida et al.

[11] 4,119,703

[45] Oct. 10, 1978

[54] PROCESS FOR REMOVAL OF NITROGEN OXIDES FROM WASTE GAS

[75] Inventors: Fusao Nishida, Tokyo; Tomiaki Yamada, Yokohama; Noriyuki Suzuki, Tokyo; Takehiko Takeda, Yokohama; Tsutomu Yanagihara, Tokyo; Katsuhiko Adachi, Yokohama; Tadashi Asanabe, Tokyo; Katuaki Ohsato, Yokohama; Kintaro Tsuda, Tokyo, all of Japan

[73] Assignee: Japan Gasoline Company, Ltd., Tokyo, Japan

[21] Appl. No.: 777,016

[22] Filed: Mar. 14, 1977

Related U.S. Application Data

[63] Continuation of Ser. No. 584,912, Jun. 9, 1975, abandoned.

[51] Int. Cl.$^2$ ............................................. B01D 53/00
[52] U.S. Cl. ................................. 423/239; 252/455 R
[58] Field of Search ..................... 423/213.2, 239, 351; 252/454, 455 R

[56]  References Cited

U.S. PATENT DOCUMENTS

| 3,008,796 | 11/1961 | Andersen et al. | 423/239 |
| 3,279,884 | 10/1966 | Nonnenmacher | 423/239 |
| 3,705,231 | 12/1972 | Biberacher | 423/239 |
| 3,895,094 | 7/1975 | Carter | 423/239 |
| 4,010,328 | 3/1977 | Shiraishi et al. | 423/239 |

FOREIGN PATENT DOCUMENTS

| 804,316 | 2/1974 | Belgium | 423/239 |
| 48,590 | 5/1974 | Japan | 423/239 |
| 1,355,214 | 6/1974 | United Kingdom | 252/455 R |

*Primary Examiner*—G. O. Peters
*Attorney, Agent, or Firm*—Cooper, Dunham, Clark, Griffin & Moran

[57]  ABSTRACT

A process for the removal of nitrogen oxides from a waste gas containing said nitrogen oxides in conjunction with sulfur oxides is disclosed, which process comprises allowing said waste gas to come into contact with ammonia as the reducing agent at temperature in the range of from 250° to 550° C in the presence of a catalyst wherein an active component containing iron or copper as the active metal is supported on a silica-alumina type carrier containing not less than 60% by weight of silica and the pore volume occupied by the pores measuring 150 Å or over in diameter exceeds 0.15 cc/g, for thereby causing selective catalytic reduction of said nitrogen oxides.

6 Claims, 3 Drawing Figures

PROCESS FOR REMOVAL OF NITROGEN OXIDES FROM WASTE GAS

This is a continuation of application Ser. No. 584,912 filed June 9, 1975, now abandoned.

BACKGROUND OF THE INVENTION (a) Field of the Invention

The present invention relates to a process for the removal of nitrogen oxides (hereinafter referred to as $NO_x$) from the waste gas containing said nitrogen oxides in conjunction with sulfur oxides (hereinafter referred to as $SO_x$) and coming out of boilers, heating furnaces and incinerators by means of catalytic reduction resorting to ammonia as the reducing agent, which is characterized by using a catalyst composed of an active component containing iron or copper as the active metal and a specific carrier.

(b) Description of the Prior Art

In recent years, effective removal of $NO_x$ contained in the waste gases from various combustion systems has become an important task in view of the mounting public issue of air pollution prevention. The true status of affairs, however, is that technical developments for such removal are lagging behind those for the removal of $SO_x$ and a feasible commercial process has not yet been described.

For the so-called denitrification, i.e. removal of $NO_x$ from waste smokes, various processes have been proposed. Of these processes, the most promising from the practical point of view is the process which effects selective catalytic reduction by use of ammonia as the reducing agent. It is known that this method uses metals of platinum family and their oxides as the catalyst. In the reaction system in which $SO_x$ is present, however, such catalysts rapidly lose their catalytic activity and will not withstand prolonged use because of the poisonous effect of $SO_x$. This is the principal reason that retards the method from practical use in spite of its outstanding features.

SUMMARY OF THE INVENTION

The process for the removal of nitrogen oxides from the waste gas according to the present invention is characterized by the fact that nitrogen oxides are removed from a waste gas containing them in conjunction with sulfur oxides by selective catalytic reduction with ammonia as the reducing agent at temperatures in the range of from 250° to 550° C. in the presence of a catalyst wherein an active component containing iron or copper as the active metal is supported on a silica-alumina type carrier containing not less than 60% by weight of silica and in which the pore volume occupied by the pores measuring 150 Å or over in diameter exceeds 0.15 cc/g.

DETAILED DESCRIPTION OF THE INVENTION

It has now been found that a catalyst having supported on a carrier an active component containing iron or copper, particularly in the form of sulfate, as the active metal exhibits high activity and high selectivity in the catalytic reduction of $NO_x$ with ammonia at a temperature from 250° to 550° C. and is highly resistant to the poisonous effect of $SO_x$. Applicants herein have already filed Patent Application No. 545,510 covering a process for the denitrification of waste gas by use of a particularly effective catalyst having supported on a carrier a sulfate of iron. It has been observed that when this catalyst is continuously used in the denitrification of a waste gas containing $SO_x$ of a concentration of the order of 1000 to 2000 ppm, the activity of the catalyst declines gradually after lapse of about 1000 hours. From the practical point of view, therefore, this catalyst cannot qualify as a satisfactory catalyst in terms of service life.

With a view to elucidating the cause for such degradation of activity, catalyst was analyzed. It was learned that γ-alumina serving as a carrier reacted with $SO_x$ to produce a large amount of aluminum sulfate. This suggests that the structural and chemical change of the carrier due to the formation of said compound may constitute the main cause for said degradation of the activity.

One possible measure to eliminate this cause is the substitution of γ-alumina with some other substance as the carrier. It has been made clear that when silica gel is used in place of γ-alumina for the carrier, for example, there is a lowering of activity, although the carrier itself is more resistant to the effect of $SO_x$.

Figure 2:
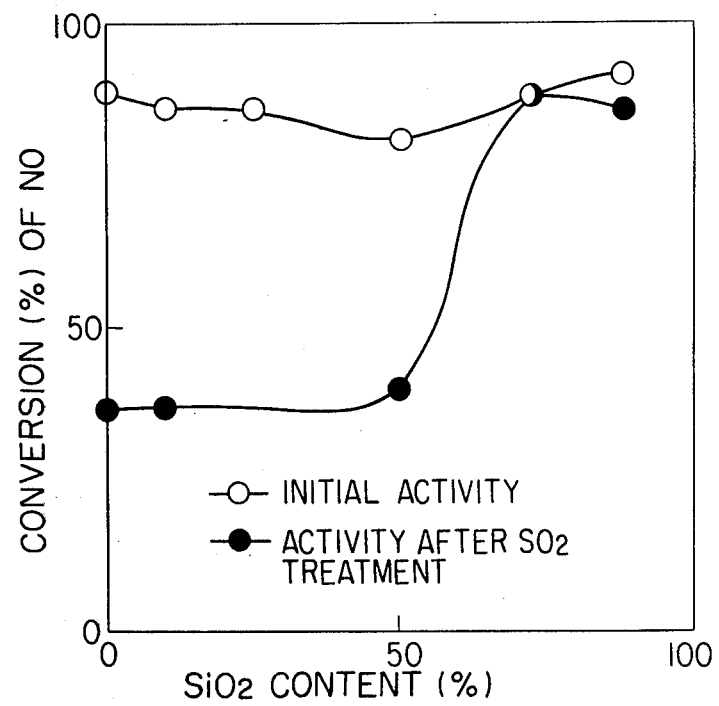
FIG. 2 is a graph showing the relationship between the silica content of the silica-alumina carrier and the initial activity and the activity after treatment of $SO_x$.

In order to develop a carrier which combines the activity of alumina with the stability of silica gel stable to $SO_x$, a number of silica-alumina carriers having varying proportions of silica and alumina were prepared and studied. It was found that catalysts with silica-alumina carriers manifest substantially the same degree of activity as catalysts using only γ-alumina, over a wide range of silica content as illustrated by Example 2 (FIG. 2). On the other hand, it was discovered that the stability of the catalysts against $SO_x$ exposure depends heavily on the silica content of the carrier, and that the activity sharply falls when the silica content of the carrier is below the level of 60% by weight.

Figure 1:
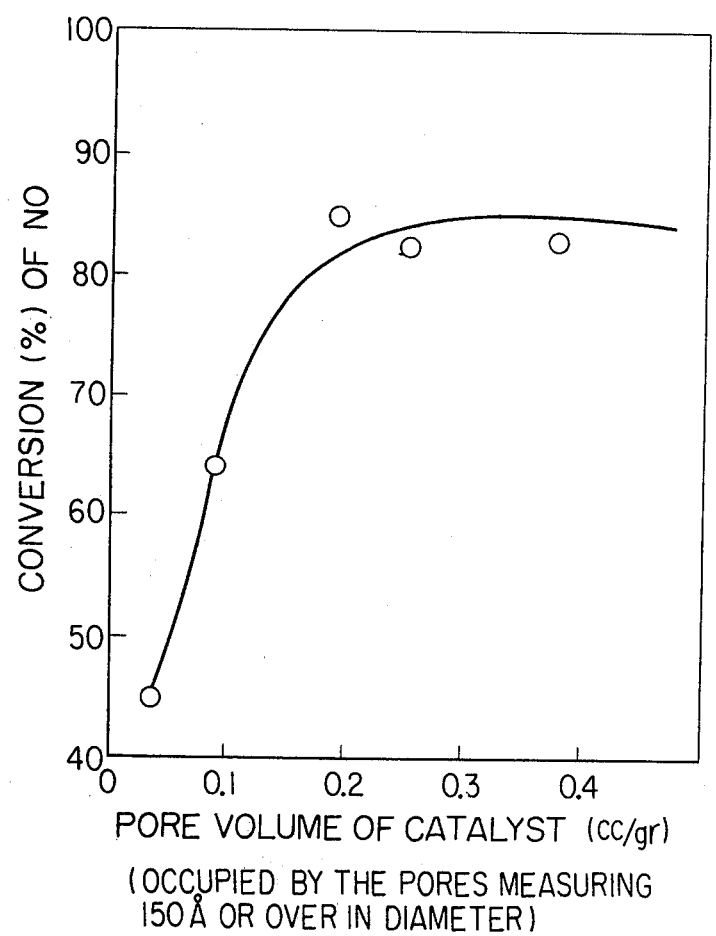
FIG. 1 is a graph indicating the effect of pore volume in the catalyst on the activity.

It was also found, as shown in FIG. 1, that the activity of the catalyst sharply falls when, in the catalyst in its final form, the pore volume occupied by pores measuring not less than 150 Å in diameter is 0.15 cc/g or above.

Accordingly, the catalysts of this invention comprise:

(a) an active component containing iron or copper.

(b) a silica-alumina carrier composite of which the silica content is 60% or over, preferably 60% to 99% by weight.

(c) a catalyst which, in its final, have a pore structure such that the pore volume occupied by pores measuring not less than 150 Å in diameter exceeds 0.15 cc/g and preferably is from 0.15 to 0.5 cc/g. to provide practically advantageous denitrification while retaining activity and selectivity at high levels together with long term stability.

The active component of the catalysts of the present invention is a sulfate or oxide of iron or copper, or a mixture of these. The silica-alumina type carrier for use in the present invention can be manufactured by any of the known methods for the preparation of synthetic silica-alumina catalysts. For example, the method which comprises the steps of preparing silica gel and alumina gel separately in advance and subsequently mixing and kneading the two gels, the method which comprises adding an acid to an alkaline solution of the two components thereby causing precipitation, or the method which comprises the steps of soaking silica gel in an aqueous aluminum sulfate solution and subsequently allowing NH$_4$OH to react thereon to induce deposition on said silica gel can be employed.

Commercially available silica-alumina carrier may be used insofar as it satisfies the requirements described above.

For deposition of the active component on such carrier, there may be used any of the known methods, for example, the kneading method which comprises the steps of mixing a powdered carrier substance with the active metal salt such as metal sulfate, metal nitrate, etc., kneading the mixture with added water and molding the blend to a desired shape, and the impregnation method which effects deposition by impregnating a molded carrier substance with an aqueous solution of the metal salt.

The active component thus deposited on the carrier is dried at 100° to 150° C., after extrusion molding in the case of the kneading method, or directly in the case of the impregnation method and thereafter calcined at 300° to 600° C. The tablet molding method is also usable for this purpose.

The activity of the catalyst increases with increasing concentration of the active component on the carrier. When the concentration exceeds a certain level, however, the method used for the preparation of the catalyst becomes too complicated to be commercially feasible. A suitable range of the concentration of active component, therefore, is from 0.5 to 20%, preferably from 1 to 10% by weight based on the weight of the carrier.

The catalyst thus prepared is required to have a physical structure such that the pore volume occupied by the pores measuring not less than 150 Å in diameter exceeds 0.15 cc/g as described above and that the total pore volume exceeds 0.5 cc/g and the specific surface area exceeds 50 m$^2$/g. Preferably, the pore volume occupied by the pores measuring not less than 150 Å in diameter falls in the range of from 0.15 cc/g to 0.5 cc/g. This is because an increase of said pore volume beyond the upper limit of 0.5 cc/g, though favorable from the standpoint of catalyst activity, tends to embrittle the catalyst and consequently impair the physical strength thereof. This means that the conditions for the preparation of the silica-alumina carrier which determine such physical property should be controlled rigidly. Further with reference to the silica-alumina carrier, the silica content of the composite carrier is required to exceed 60% by weight and preferred to fall in the range of from 60 to 99%, especially from 70 to 90%, by weight. This is because the activity of the catalyst is degraded when the silica content exceeds 99% by weight.

In the practice of the process according to this invention, the reaction temperature is required to be maintained at from 250° to 550° C. At temperatures below the lower limit 250° C., the activity is too low to obtain the desired conversion of NO$_x$. At temperatures over the upper limit 550° C., however, the active component, especially the metal sulfate becomes unstable and the formation of NO due to the reaction of ammonia with oxygen increases to an unacceptable level.

In the selection of the temperature conditions, the close relation thereof with the hourly space velocity of the gas being treated must be taken into account. For the purpose of the present invention, the gas hourly space velocity (GHSV) is from 1000 to 50000 HR$^{-1}$.

As regards the amount of ammonia to be used as the reducing gas, when this amount is small relative to that of NO$_x$ in the waste gas, the conversion of NO$_x$ is inferior but when the amount is excessive, the percentage accounted for by the cost of the reducing agent in the total cost of treatment is large and a secondary treatment is required for removing residual ammonia from the treated gas being discharged from the denitrification process. All considered, the molar ratio of NH$_3$/NO is desired to fall in the range of from 0.8 to 1.5, preferably from 1.0 to 1.2.

In the practice of the present invention, there can be used any ordinary packed-bed type reactor. The so-called honey-comb type reactor or any other reactor designed to minimize possible loss of pressure can also be used.

The particular advantages of this invention are that the catalyst maintains its high activity and stability for a long period of time without requiring very rigid control of the temperature of the reactor because the reaction temperature range in which the selectivity relative to the oxygen coexisting in the waste gas is wider than with the conventional catalyst; the range of operating temperatures required for high conversion of NO$_x$ is wider; and the tolerance for reaction temperature change is greater.

Since the catalyst is resistant to SO$_x$, the denitrification process of this invention enjoys the advantage that it can be incorporated in the whole waste gas treatment system either before or after the desulfurization process.

DESCRIPTION OF THE PREFERRED EMBODIMENTS

Example 1

A SiO$_2$.Al$_2$O$_3$ hydrogel was prepared by adding aluminum sulfate solution to a SiO$_2$ hydrogel obtained from water glass, JIS No. 4 and subsequently neutralizing the resultant mixture with aqueous ammonia. The hydrogel was washed, filtered, dried in air and thereafter molded with an extruder. This mold was given a preliminary drying and then calcined at an elevated temperature to produce a SiO$_2$.Al$_2$O$_3$ carrier. A total of five such carriers having different pore volumes were obtained by changing the aging temperature during the preparation of the SiO$_2$ hydrogel. The silica-alumina carriers thus obtained were in the form of cylinders measuring 1.5 mm in diameter and 3 to 5 mm in length. The physical properties thereof were as shown in Table 1. The silica content was invariably 86% by weight.

By the impregnation method, ferrous sulfate was supported on each silica-alumina carrier to an extent such that 6% by weight of iron was supported based on the weight of carrier. Each composite thus formed was dried at 110° C. and calcined at 550° C. for 3 hours in the current of air. The physical properties of the five catalysts thus produced are shown in Table 1 in conjunction with the physical properties of the corresponding carriers.

A stainless steel-made reaction tube 20 mm in outside diameter and 500 mm in overall length was charged with 10 ml of each catalyst and then held at a prescribed temperature by means of an electric heater. A simulated gas consisting of 500 ppm of NO, 550 ppm of $NH_3$, 1500 ppm of $SO_2$, 3% of $O_2$, 10% of $H_2O$ and the balance of $N_2$ was introduced into the reaction tube at a rate of 260 Nl/hr and the discharge gas was measured for NO concentration at the outlet of the reaction tube at 400° C., to calculate NO conversion.

The results of the reaction thus obtained are indicated in FIG. 1 in terms of the relationship between the pore volume of pores measuring not less than 150 Å in diameter and the NO conversion. From the graph, it is seen that the pore diameter and the pore volume of the catalyst have a very large effect on the reaction and that, to expect a high $NO_x$ conversion, the pore volume of the pores measuring not less than 150 Å in diameter should exceed at least 0.15 cc/g.

Table 1

| Physical properties of carrier and catalyst | | | | | |
|---|---|---|---|---|---|
| | A | B | C | D | E |
| Specific surface area (m²/g) | 303 (433) | 297 (413) | 283 (381) | 295 (387) | 264 (351) |
| Total pore volume (cc/g) | 0.69 (0.85) | 0.59 (0.74) | 0.63 (0.78) | 0.49 (0.62) | 0.37 (0.48) |
| Pore volume of pores measuring 150 Å or over in diameter | 0.35 (0.44) | 0.25 (0.31) | 0.19 (0.25) | 0.09 (0.11) | 0.04 (0.04) |

The value in the brackets are of the carrier.

Example 2

Five silica-alumina carriers having different silica contents were prepared by the coprecipitation method using sodium silicate and aluminum sulfate as the starting materials. These carriers were in the form of cylinders measuring 1.5 mm in diameter and 3 to 5 mm in length. The physical properties thereof were as shown in Table 2.

By following the procedure of Example 1, iron sulfate-supported catalysts were obtained from the five different carriers. In each catalyst, the iron sulfate content was controlled so as to give a proportion of 6% by weight of iron based on the weight of the carrier. The physical properties of the five catalysts thus obtained are shown in Table 2 in conjunction with the physical properties of the corresponding carriers.

The reaction was carried out using the same reaction system as Example 1 under the same condition thereof except that the reaction temperature was 400° C.

The results of the reaction obtained are shown in FIG. 2. From the graph, it can be seen that the initial activity was not varied much by the silica-alumina content of the carrier.

To rate the catalysts with respect to resistance to $SO_x$, the five catalysts mentioned above were treated each with a gas composed of 15% of $SO_2$, 15% of $O_2$, 10% of $H_2O$ and 60% of $N_2$ under conditions of 380° C. and 3500 $HR^{-1}$ of GHSV.

The catalysts which had undergone the treatment and the corresponding untreated catalysts were tested for activity by the method described above. The results of this test are indicated also in FIG. 2. From the graph, it is seen that the iron sulfate catalyst supported on a silica-alumina composite of low silica content showed low resistance to $SO_x$ and that the silica-alumina composite having at least 60% by weight of silica content served satisfactorily as the carrier.

Table 2

| Physical properties of carrier and catalyst | | | | | |
|---|---|---|---|---|---|
| | J | F | G | H | I |
| $SiO_2$ carrier contents (wt%) | 9.8 | 26.1 | 51.1 | 71.6 | 86.1 |
| Specific Surface area (m²/g) | 207 (288) | 298 (380) | 334 (482) | 300 (399) | 236 (415) |
| Total pore volume (cc/g) | 0.75 (0.92) | 0.70 (0.87) | 0.50 (0.66) | 0.86 (1.05) | 0.71 (0.87) |
| Pore volume of pores measuring 150 Å or over in diameter | 0.25 (0.31) | 0.14 (0.20) | 0.18 (0.24) | 0.31 (0.36) | 0.31 (0.44) |

Example 3

An iron sulfate catalyst supported on a silica-alumina composite having 86.13% by weight of $SiO_2$ content and prepared by the procedure of Example 2 and a copper sulfate catalyst prepared by causing copper sulfate supported on the same carrier by the impregnation method as described in Example 1 were subjected to a prolonged test. The copper sulfate catalyst had a copper content of 6.0% by weight based on the weight of carrier. For the purpose of comparison, an impregnated catalyst having an iron content of 6.0% by weight was prepared by using, as the carrier, $\gamma$-$Al_2O_3$ (in the form of pellets 1.5 mm in diameter and 3 to 5 mm in length) having 0.44 g/cc of bulk density, 226 m²/g of surface area and 0.85 cc/g of pore volume (of which 0.22 cc/g was accounted for by pores measuring not less than 150 Å in diameter) and it was subjected likewise to a prolonged test.

A reaction system similar to that used in Example 1 was packed with each catalyst. A simulated gas having the same composition as that used in Example 1 was introduced at a rate of 12000 $HR^{-1}$ of GHSV (STP) and the discharged gas was measured for NO conversion at 400° C.

Figure 3:
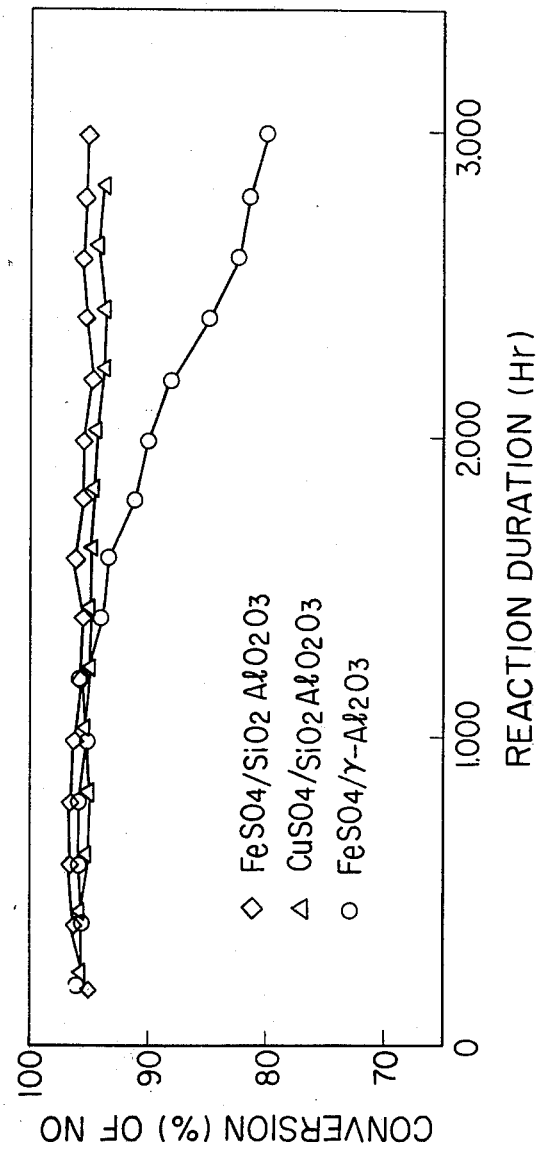
FIG. 3 is a graph showing the change of activity of the catalyst with time.

The results of the reaction thus obtained are indicated in FIG. 3. The graph shows that a lowering of activity began to appear after lapse of more than 1000 hours of reaction in the case of the catalyst using $\gamma$-$Al_2O_3$ carrier, whereas the activity lasted even after about 3000 hours of reaction in the case of the catalyst using the silica-alumina carrier.

In the preceding preferred embodiments, there were used catalysts containing iron sulfate and copper sulfate as the active component. Tests using catalysts containing iron oxide or copper oxide as the active component gave outstanding results as compared with the test using the catalyst containing $\gamma$-alumina as the carrier.

What is claimed is:

1. A process for the reductive removal of nitrogen oxides from waste gas containing said oxides in conjunction with sulfur oxides which cmprises contacting said waste gas having a GHSV of from 1000 to 50,000 $HR^{-1}$ with ammonia at a termperature of from 250° to 500° C. in the presence of a catalyst, the active component of which is selected from the group consisting of oxides and sulfates of iron and copper and mixtures thereof, the catalyst being supported on a silica-alumina type carrier containing at least 60% by weight of silica, the amount of the active component being from 0.5 to 20% by weight based on the weight of the carrier, the pore volume of the catalyst occupied by pores measuring at least 150 Å in diameter being from 0.15 cc/g to 0.5 cc/g, the total pore volume of the catalyst being at least 0.5 cc/g and the specific surface area of the catalyst being at least 50 m²/g.

2. The process according to claim 1, wherein the amount of the active component is from 1 to 10% by weight of active metal based on the carrier.

3. The process according to claim 1, wherein the silica-alumina carrier contains from 60 to 99% by weight of silica.

4. The process according to claim 3, wherein the silica-alumina carrier contains from 70 to 90% by weight of silica.

5. The process according to claim 1, wherein the volume of ammonia supplied as the reducing agent is such that the $NH_3NO$ molar ratio is from 0.8 to 1.5.

6. The process according to claim 1, wherein the molar ratio of $NH_3NO$ is from 1.0 to 1.2.

* * * * *

UNITED STATES PATENT OFFICE
CERTIFICATE OF CORRECTION

PATENT NO. : 4,119,703
DATED : October 10, 1978
INVENTOR(S) : FUSAO NISHIDA ET AL.

It is certified that error appears in the above–identified patent and that said Letters Patent are hereby corrected as shown below:

After line 14 of column 1, insert --

[30] Foreign Application Priority Data

June 11, 1974 [JP] Japan......49-65569

Signed and Sealed this

Sixteenth Day of January 1979

[SEAL]

Attest:

RUTH C. MASON
Attesting Officer

DONALD W. BANNER
Commissioner of Patents and Trademarks